United States Patent [19]

Sugimoto et al.

[11] Patent Number: 4,644,756

[45] Date of Patent: Feb. 24, 1987

[54] MULTI-ROOM TYPE AIR CONDITIONER

[75] Inventors: Takayuki Sugimoto; Yoshiyuki Okuzawa; Nobuo Suzuki, all of Kusatsu, Japan

[73] Assignee: Daikin Industries, Ltd., Osaka, Japan

[21] Appl. No.: 682,312

[22] Filed: Dec. 17, 1984

[30] Foreign Application Priority Data

Dec. 21, 1983 [JP] Japan ............................ 58-242766
Dec. 21, 1983 [JP] Japan ............................ 58-242770
Nov. 24, 1984 [JP] Japan ............................ 59-248527

[51] Int. Cl.⁴ .............................................. F25B 13/00
[52] U.S. Cl. ...................................... 62/160; 62/200; 62/225
[58] Field of Search ............... 62/160, 199, 200, 204, 62/205, 206, 210, 212, 224, 225; 236/1 B; 165/22

[56] References Cited

U.S. PATENT DOCUMENTS 4,307,576 12/1981 Takano et al. ..................... 62/204
4,375,753  3/1983 Imasu et al. ....................... 62/160
4,393,662  7/1983 Dirth ............................. 236/1 B X
4,510,767  4/1985 Komatsu et al. ................... 62/200

Primary Examiner—Harry Tanner
Attorney, Agent, or Firm—Stevens, Davis, Miller & Mosher

[57] ABSTRACT

A multi-room type air-conditioner includes an outdoor unit and a plurality of indoor units connected thereto and is capable of providing cooling and hearing by change-over of a 4-way valve. A plurality of motorized valves are provided on each liquid line of the outdoor unit, respectively in order to control superheat of low pressure gaseous refrigerant at the use-side heat exchanger outlet of each indoor unit in cooling and also to control sub-cool of high pressure liquid refrigerant at the heat exchanger outlet in heating. The motorized valve is completely closed in cooling mode for the non-operating indoor unit and the motorized valve for the non-operating indoor unit is controlled in the heating mode to have a small opening so that no liquid refrigerant accumulation takes place in the non-operating indoor unit.

13 Claims, 15 Drawing Figures

MULTI-ROOM TYPE AIR CONDITIONER

FIELD OF THE INVENTION

This invention relates to a multi-room type air-conditioner or more particularly to a multi-room type air-conditioner which comprises an out-door unit having a compressor, 4-way valve and a source-side heat exchanger, and a plurality of indoor units each having a use-side heat exchanger and which a fan and is capable of providing cooling and heating by the change-over of said 4-way valve.

PRIOR ART OF THE INVENTION

Generally in a multi-room type air-conditioner connecting a plurality of in-door units with an out-door unit, it is common to connect liquid line and gaseous line mains of an out-door unit respectively to liquid line and gaseous line branches each as many as the number of in-door units connected therewith and to mount a solenoid valve on each branch to switch on an off as said in-door unit operates or shuts down. However, since a solenoid valve carries out an on-and-off operation only and the valve is fully opened in the on-operation, it is necessary to provide an indoor unit with a pressure reducing mechanism for cooling and a check valve bypassing said expansion mechanism and an out-door unit with a pressure reducing mechanism for heating and a check valve bypassing said pressure reducing mechanism. Further, it is necessary to provide a bypass passage to purge, to the low pressure side, refrigerant accumulating in the shut-off indoor unit due to leakage at gaseous line branch solenoid valve, which complicates the refrigerant circuit and increases cost. Thus, as indicated above, two main problems exist in prior art systems.

Further, to cope with said problems, a system of using a thermal-electric expansion valve in lieu of a solenoid valve of a liquid line branch was disclosed as shown in Japanese Patent Unexamined Publication No. Sho 56-49,856. The brief explanation of the prior art is as follows: As shown in FIG. 15, in a multiroom type air-conditoner comprising an out-door unit A having a compressor 51, 4-way valve 52 and source-side heat exchanger 53 and a plurality of in-door units each having a use-side heat exchanger 54 and a fan 55 which are connected to said out-door unit A by means of a plurality of connection pipes C, a thermal-electric expansion valve 58 is provided on each liquid line branch 57 branching out from the liquid line main 56 of said out-door unit A and a solenoid valve 61 is provided on each gaseous line branch 60 branching out from the gaseous line main 59. Further numeral 62 represents a No. 1 receiver mounted on said liquid line main and numeral 63 represents No. 2 receivers mounted on each liquid line branch. Liquid refrigerant is received by No. 1 receiver 62 in cooling and by No. 2 receivers 63 in heating and then fed to said expansion valve 58.

Said expansion valve 58 utilizes bi-metal and electric heater heating said bi-metal and is constructed so as to control the valve opening by controlling the current through said electric heater and applicable to the expansion mechanism in both cooling and heating. Therefore, it is not necessary to mount expansion valves separately for cooling and heating, which simplifies the refrigeration circuit to that extent. However, since said expansion valve 58 is constructed to completely close in cooling and fully open in heating, it is necessary to provide a solenoid valve 61 on said gaseous line branch 60. Further, since said expansion valve 58 is used as the pressure reducing mechanism in both cooling and heating, it is necessary to mount No. 2 receiver 63 on each liquid line branch 57 as well as to mount No. 1 receiver 62 on said liquid line main 56, as a result of which a drastic reduction of components cannot be expected and the complexity of the piping work cannot be completely solved.

Further, since said expassion valve 58 controls the degree of superheat only both in cooling and heating and cannot control the degree of sub-cool and expecially in heating, it controls the degree of super-heat of low pressure gaseous refrigerant at the outlet of said source-side heat exchanger 53 of the out-door unit A, it is impossible to provide an appropriate refrigerant distribution to each in-door unit B. No descriptions are made in said literature of prior art as to the concrete construction to provide an appropriate refrigerant distribution to each in-door unit B, while controlling the degree of super-heat.

SUMMARY OF THE INVENTION

The major objective of this invention is to provide a multi-room type air-conditioner wherein it is possible to prevent liquid refrigerant from accumulating in the non-operating in-door unit without using a solenoid valve on each gaseous line branch which is used in conventional systems and at the same time to control, by means of a motorized valve mounted on each liquid line branch, the degree of super-heat of low pressure gaseous refrigerant at the outlet of the use-side heat exchanger of each indoor unit in cooling and the degree of sub-cool of high pressure liquid refrigerant at the outlet of said use-side heat exchanger in heating and reduce the drift of the refrigerant flow to be admitted into the operating indoor units during heating.

Further, a second objective of this invention is to control the degree of opening of said motorized valve in response to operating in-door units and by comparing the mean temperature of high pressure liquid refrigerant flowing through each liquid line branch with each respective temperature and thereby reduce the drift of refrigerant flow to the operating in-door unit during heating.

A third objective of this invention is to prevent for certain liquid refrigerant from accumulating in the non-operating indoor unit by modulating the opening of said motorized valve corresponding to the non-operating in-door unit.

Further, a fourth objective of this invention is to provide a multi-room type air-conditioner wherein it is possible to control superheat at the source-side heat exchanger outlet in heating and/or sub-cool at said heat exchanger outlet in cooling while providing control, by means of said motorized valve, of superheat at the use-side heat exchange outlet in cooling and sub-cool at said heat exchanger outlet in heating, and thereby to improve heating and/or cooling capacity and EER.

This invention is characterized by the following construction for a multi-room type air-conditioner which comprises an out-door unit having a compressor, a source-side heat exchanger and a 4-way valve with high/low pressure change-over ports, a plurality of in-door units each having a use-side heat exchanger and a fan, and a plurality of connection pipes connecting said in-door unit with said out-door unit and which is capable of providing both cooling and heating by change-over of said 4-way valve.

That is, said construction comprises (1) a liquid line main connected to the source-side heat exchanger and passing liquid refrigerant, (2) a plurality of liquid line branches branching out from said liquid line main and connected with said connection pipes, (3) a gaseous line main connected to the high pressure change-over port and passing gaseous refrigerant, (4) a plurality of gaseous line branches branching out from said gaseous line main and connected with said connection pipes, (5) a plurality of motorized valves mounted on each liquid line branch and capable of controlling the valve opening at an arbitrary opening from the completely closed position, (6) means for controlling superheat of low pressure gaseous refrigerant at said use-side heat exchanger outlet in cooling and sub-cool of high pressure liquid refrigerant at said use-side heat exchanger in heating, (7) means for completely closing said motorized valve connected to the non-operating in-door unit in cooling, (8) means for switching off the fan of the non-operating unit in heating, (9) means for controlling, at a small opening, said motorized valve mounted on the liquid line branch connected to a non-operating in-door unit in heating, all of which are provided on the outdoor unit. Therefore, according to this invention, it is possible, without using said solenoid valve used in the prior art system to prevent certain liquid refrigerant from accumulating in the non-operating in-door unit by closing said motorized valve connected to the non-operating in-door unit in cooling and controlling said motorized valve at a small opening in heating, which reduces the number of components and simplifies the construction. Further, it is possible, by means of said motorized valve, to control superheat of low pressure gaseous refrigerant at the use-side heat exchanger outlet in cooling and sub-cool of high pressure liquid refrigerant at the use-side heat exchanger in heating and especially in heating, optimize capacity distribution by reducing the drift of refrigerant flow to the operating in-door units.

The opening of said motorized valve connected to the operating indoor unit can be controlled by the loading applied on each respective indoor unit but it may be also controlled, as with one embodiment of the invention, in accordance with the number of in-door units in operation.

In this case, a means of operation sensing that finds out, by each indoor unit, whether it is operating or not and sums up the number of indoor units in operation and a means of valve opening control that controls, at a given opening, said motorized valves mounted on the liquid line branches connected to the operating indoor units, based on the checking result of said operation sensing are incorporated.

Further, as another embodiment, of the invention the valve opening is controlled in heating so that during a certain time after the start of the operation, the valve opening is set at a given opening and thereafter the temperatures of high pressure liquid refrigerant at useside heat exchanger outlets in heating are sensed and mean value of said temperatures are calculated and valve openings are controlled by comparing said mean temperature with each respective temperature.

In this case, incorporated into the system are (1) operation mode sensing means for checking whether the air-conditioner is in heating mode or in cooling mode, (2) said operation sensing means, (3) means for sensing high pressure liquid refrigerant temperature at each use-side heat exchanger outlet in heating, (4) means for providing valve opening control which maintains motorized valves mounted on liquid line branches connected to operating indoor units at a given opening for a certain time after the start of the heating operation, (5) means for sensing the mean temperature of said high pressure liquid refrigerant at the useside heat exchanger outlet of the operating indoor unit, (6) first comparing means which compares said mean temperature with said each liquid refrigerant temperature, and (7) adjusting means which makes the liquid refrigerant temperature at the use-side heat exchanger outlet of the operating indoor unit close to said mean temperature. Therefore, it is possible in this embodiment to control sub-cool of said high pressure liquid refrigerant in heating in accordance with room loading and optimize capacity distribution by reducing drift of refrigerant flow to the indoor units while utilizing efficiently each use-side heat exchanger and improving heating capacity and EER by controlling adequately subcool.

Further, while the motorized valve mounted on the liquid line branch connected to the non-operating indoor unit is completely closed in cooling and controlled at a small opening in heating for prevention of liquid refrigerant accumulation in said indoor unit, said controlling at a small opening is carried out by setting compulsorily at a predetermined small opening or based on the sensing means provided to sense the high pressure liquid temperature at said use-side heat exchanger outlet. Further, the small opening of said No. 1 motorized valve is such that as much refrigerant as is necessary to condense in the use-side heat exchanger by natural radiation with the fan stopped is admitted.

In case of a predetermined small opening setting of the motorized valve corresponding to the non-operating indoor unit in heating, when liquid refrigerant temperature at the use-side heat exchanger outlet of the non-operating indoor unit is found lower than said mean temperature in comparing the sensing results of said liquid refrigerant temperature sensing means with said mean temperature, it is possible to prevent liquid accumulation in the non-operating indoor unit by providing a means of modulating the opening of said motorized valve to the opening side.

Further, in this invention, it is also possible to provide, on said liquid line main, the superheat control valve which controls low pressure gaseous refrigerant superheat at the source side heat exchanger outlet in heating or the sub-cool control valve which controls high pressure liquid refrigerant sub-cool at said source-side heat exchanger outlet in cooling.

In this case, a receiver is mounted between said superheat control valve or sub-cool control valve and the branching point of said liquid line branches and superheat sensing means for low pressure gaseous refrigerant at the source-side heat exchanger outlet in heating or sub-cool sensing means for high pressure liquid refrigerant at said heat exchanger outlet in cooling is provided. Thereby, it is possible to control superheat in heating or sub-cool in cooling together with superheat control in cooling or sub-cool control in heating at the use-side heat exchanger outlet provided by said motorized valves mounted on said liquid line branches (For convenience of explanation, hereinafter called No. 1 motorized valves).

Further, as said control means, a motorized valve (hereinafter called No. 2 motorized valve) is primarily in use and when said No. 2 motorized valve is used, it is possible to construct so that No. 2 motorized valve controls sub-cool at said source-side heat exchanger outlet in cooling and super-heat at said heat exchanger outlet in heating.

In this case, it is possible to control, by means of said No. 1 motorized valve, superheat in cooling and sub-cool in heating and by means of said No. 2 motorized valve, sub-cool in cooling and super-heat in heating and thereby to operate efficiently the source-side heat exchanger and each use-side heat exchangers for improvement of cooling and heating capacity and EER.

These and other objects of the invention will be detailed and understood according to the accompanying drawings.

DETAILED DESCRIPTION OF PREFERRED EMBODIMENTS OF THE INVENTION

Figure 1:
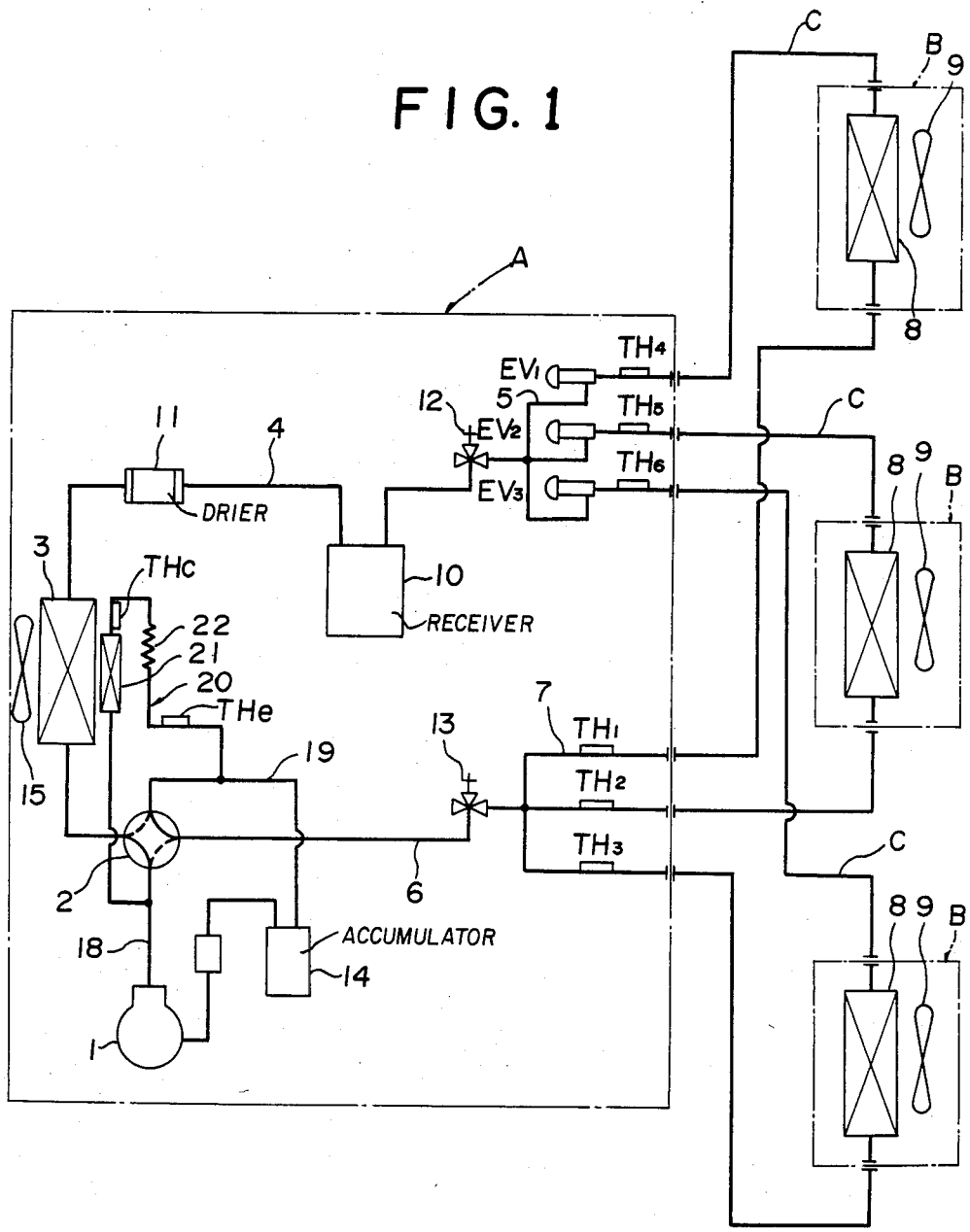
FIG. 1 is the refrigerant piping diagram showing a first embodiment of this invention.

Shown in FIG. 1 is a typical embodiment of this invention wherein the refrigerant piping system comprises an out-door unit A having a compressor 1, a 4-way valve 2, a source-side heat exchanger 3, a liquid line main 4, a plurality of liquid line branches 5 branching out of said liquid line main 4, gaseous line main 6 and a plurality of gaseous line branches 7 branching out of said gaseous line main and a plurality of indoor units B each having a use-side heat exchanger and a fan which are installed in parallel between said liquid line branches 5 and said gaseous line branches 7 through a plurality of connection pipes C and said system is capable of providing cooling or heating by the change-over of said 4-way valve.

Further, as shown in FIG. 1, the above constructed multiroom type air-conditioner system is provided, on said liquid line branches 5, with No. 1 motorized valves $EV_1$–$EV_3$ each capable of controlling the opening at an arbitrary position from the completely closed postion and on said liquid line main, with a receiver 10.

Further in FIG. 1, numeral 11 is a drier, numerals 12, 13 are stop valves mounted respectively on the liquid line main 4 and gaseous line main 5, numeral 14 is an accumulator and numeral 15 is a fan attached to said source-side heat exchanger 3.

Figure 2:
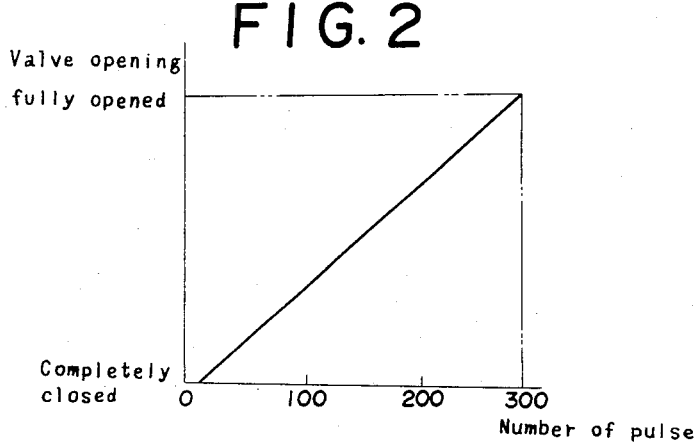
FIG. 2 is the opening characteristics curve of a motorized valve.

Further in this construction, said No. 1 motorized valves $EV_1$–$EV_3$ are primarily of the pulse motor type which revolves a certain angle per one pulse and can be controlled, as shown in FIG. 2, at an arbitrary position between the completely closed and fully opened position by controlling the pulse number input to said motorized valves.

Further, said No. 1 motorized valves $EV_1$–$EV_3$ are controlled at the predetermined opening in accordance with the room loading of said indoor units B and controlled at 0 opening in cooling and at a small opening in heating for the non-operating indoor unit B.

First, explanation will be given about the valve opening control of No. 1 motorized valves corresponding to the operating indoor unit B. The embodiment of FIG. 1 incorporates superheat sensing means, comprising No. 1 temperature sensor $TH_1$–$TH_3$, which senses low pressure gaseous refrigerant temperature $T_1$–$T_3$ at each use-side heat exchanger 8 outlet in cooling of said indoor units B, No. 1 temperature sensing means senses the saturation temperature $T_e$ of low pressure gaseous refrigerant, and superheat control means controls superheat of low pressure gaseous refrigerant at the use-side heat exchanger outlet in cooling of each operating indoor unit by adjusting valve opening based upon the sensing result of said superheat sensing means. At the same time, the first embodiment includes sub-cool sensing means comprising No. 3 temperature sensors $TH_4$–$TH_6$ which senses high pressure liquid refrigerant temperature $T_4$–$T_6$ at said use-side heat exchanger outlet in heating of said indoor units and No. 2 temperature sensing means which senses the saturation temperature $T_c$ of high pressure liquid refrigerant. The first embodiment further includes sub-cool control means which controls sub-cool of high pressure liquid refrigerant at said use-side heat exchanger 8 outlet in heating by adjusting the valve opening of the No. 1 motorized valves $EV_1$–$EV_3$ based upon the sensing result of said sub-cool sensing means.

Said No. 1 temperature sensing means can be constructed, as shown in the second embodiment, so that a sensing circuit 16 (hereinafter called No. 1 sensing circuit) is provided between the liquid line main 4 or receiver 10 of the outdoor unit A and the suction side of the compressor with pressure reducing mechanism 17 mounted in-between and so that No. 2 temperature sensor $TH_e$ is mounted between said pressure reducing mechanism 17 and the suction side of compressor 1 in order to sense the saturation temperature $T_e$ of low pressure gaseous refrigerant. The embodiment of FIG. 1 is constructed so that a temperature sensing circuit 20(hereinafter called No. 2 sensing circuit) is provided between the discharge line 18 connecting compressor 1 with 4-way valve 2 and the suction line 19 connecting 4-way valve 2 with compressor 1 with sensing heat exchanger 21 and pressure reducing mechanism 22 mounted in-between. No. 2 temperature sensor $TH_c$ is mounted between said pressure reducing mechanism 22 and the suction side of compressor 1 in order to sense the saturation temperature $T_e$ of low pressure gaseous refrigerant.

Further, said No. 2 sensing circuit 20 also serves as No. 2 temperature sensing means by mounting No.4 temperature sensor $TH_c$ between said sensing heat exchanger for sensing for sensing 21 and said pressure reducing mechanism 22 in order to sense the saturation temperature $T_c$ of high pressure liquid refrigerant passing said heat exchanger 21.

Further, in the above-stated construction, said No. 1 temperature sensors $TH_1$-$TH_3$ are mounted on each gaseous line branch 7 and by means of said No. 1 temperature sensors $TH_1$-$TH_3$ and said No. 2 temperature sensor $TH_e$, superheat of low pressure gaseous refrigerant at the use-side heat exchanger 8 outlet in cooling of said indoor unit can be sensed. Further, said No. 3 temperature sensors $TH_4$-$TH_6$ are mounted respectively on each liquid line branch 5 and by means of said No. 3 temperature sensors $TH_4$-$TH_6$ and said No. 4 temperature sensor $TH_c$, it is possible to sense sub-cool of high pressure liquid refrigerant at said use-side heat exchanger outlet in heating.

And each temperature sensor of the super-heat and sub-cool sensing means constructed as described above is electrically connected to the opening control regulators(not shown) for said each motorized valve $EV_1$—$EV_3$ to input the outputs of said temperature sensors into said regulators and thereby control the opening of said motorized valve $EV_1$-$EV_3$ for control of superheat in cooling and sub-cool in heating.

In the abovesaid embodiment, since said No. 2 sensing circuit 20 is provided on the out-door unit A, said No. 1 temperature sensors $TH_1$-$TH_3$ mounted on the gaseous line branches 7, said No. 3 temperature sensor $TH_4$-$TH_6$ mounted on the liquid line branches 5, all wirings connecting said No. 1 and No. 3 temperature sensors $TH_1$-$TH_6$ and the regulator of said motorized valve $EV_1$-$EV_3$ for signal transmission are provided within the out-door unit A, which eliminates control wiring between the outdoor and indoor units.

Further, since said motorized valves $EV_1$-$EV_3$ are mounted on the liquid line branches only and no motorized valves or solenoid valves of the conventional system are mounted on the gaseous line branches 7, it is possible to reduce the number of components to that extent and to simplify the refrigerant piping system. Since said motorized valves $EV_1$-$EV_3$ completely close in cooling and open at a small opening in heating for a non-operating unit B, no liquid accumulation takes place in the non-operating indoor unit B.

In a non-operating indoor unit B, since the fan stops and thereby radiation at said use-side heat exchanger is reduced to small amount handled by natural radiation, said motorized valve $EV_1$-$EV_3$ is controlled at a small opening, that is an opening as small as to admit liquid refrigerant condensing by natural radiation. Further, the small opening of said motorized valve $EV_1$-$EV_3$ in heating may be compulsorily set at an predetermined small opening.

Next, explanation will be given of the second embodiment shown in FIG. 3 through FIG. 6

The construction of this embodiment is basically the same as the first embodiment shown in FIG. 1 and the difference is that a superheat control valve is mounted on said liquid line main 4 in order to control superheat of low pressure gaseous refrigerant the outlet of the source-side heat exchanger 3 in heating.

While an externally equalizing or internally equalizing expansion valve may be used as this superheat control valve, a motorized valve of pulse motor type is primarily used in the second embodiment as with No. 1 motorized valve $EV_1$-$EV_3$. For convenience of explanation it is called No. 2 motorized valve and is expressed by $EV_4$.

Further, in the second embodiment as in the first embodiment, one receiver 10 is provided between No. 1 motorized valve $EV_1$-$EV_3$ and No. 2 motorized valve $EV_4$. Moreover, No. 1 sensing circuit 16 is provided between the gaseous area of said receiver 10 and said suction line 19 in order to sense the saturation temperature $T_e$ of low pressure gaseous refrigerant. No. 1 sensing circuit 16 of this embodiment is for control of valve opening of No. 2 motorized valve $EV_4$ and as stated above, contains pressure reducing mechanism 17 such as capillary tube and said No. 2 temperature sensor $TH_e$ is mounted on this No. 1 sensing circuit 16 between said pressure reducing mechanism 17 and said suction line 19, and No. 5 temperature sensor $TH_7$ is mounted on the suction line 19 in order to sense low pressure gaseous refrigerant temperature $T_7$.

Therefore, the deviation $E_1$ is sought between the target superheat SH and a temperature sensed by the No. 2 and No. 5 temperature sensors $TH_e, TH_7$, that is, $E_1 = T_7 - T_e - SH$, and said No. 2 motorized valve $EV_4$ is controlled, for example, by P control(Proportional-Pulse Control), PD Control(Proportional-Pulse-Derivative Control) or PID Control(Proportional-Pulse Integral-Derivative Control). In a case where the above-stated conventional super-heat control valve is used insted of said No. 2 motorized valve $EV_4$, a bypass circuit bypassing said conventional superheat control valve is provided on said liquid line main 4 and on said bypass circuit, a check valve is mounted to pass refrigerant in cooling.

Further, said No. 1 motorized valve $EV_1$-$EV_3$ in this second embodiment is, unlike that of the first embodiment, controlled of its opening by pulse input changing with the number of the operating indoor units B, for example, 160 pulses in cooling and 150 pulses in heating for one room operation, 120 pulses in cooling and 100 pulses in heating for two room operation and 100 pulses in cooling and 70 pulses in heating for 3 room operation; and No. 1 motorized valve $EV_1$-$EV_3$ corresponding to the non-operating indoor unit B is, like that of the first embodiment, completely closed in cooling and controlled at a small opening in heating which corresponds, for example to 40 pulses input.

Figure 4:
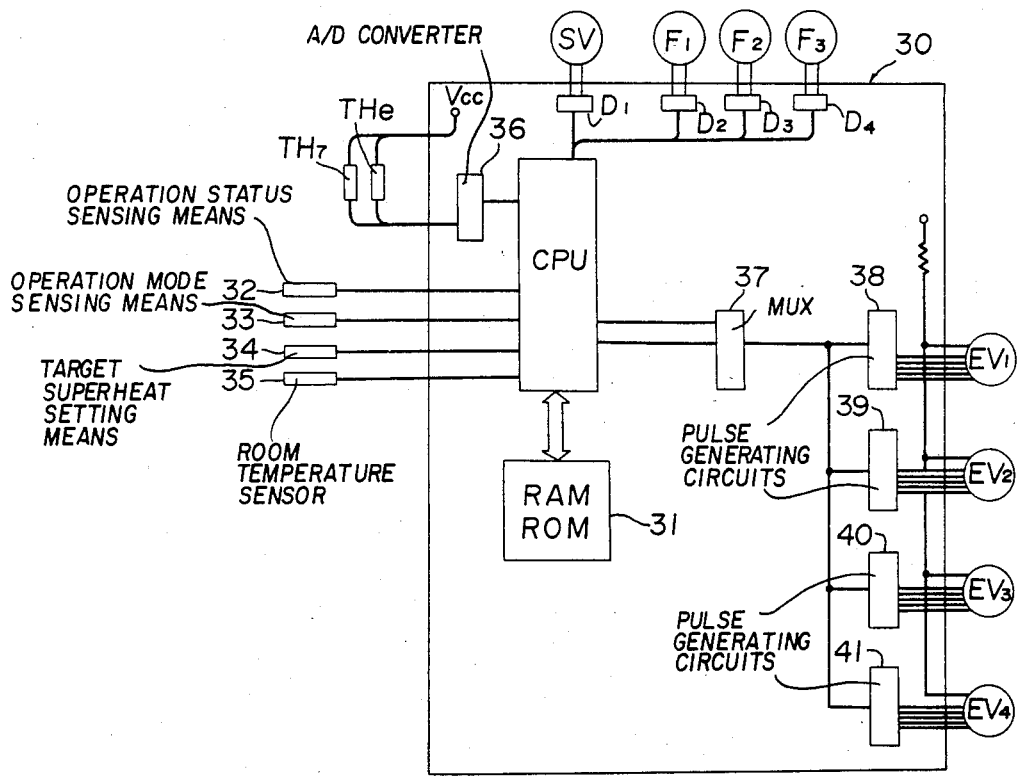
FIG. 4 is the schematic drawing showing the outline of the controller thereof.
Figure 3:
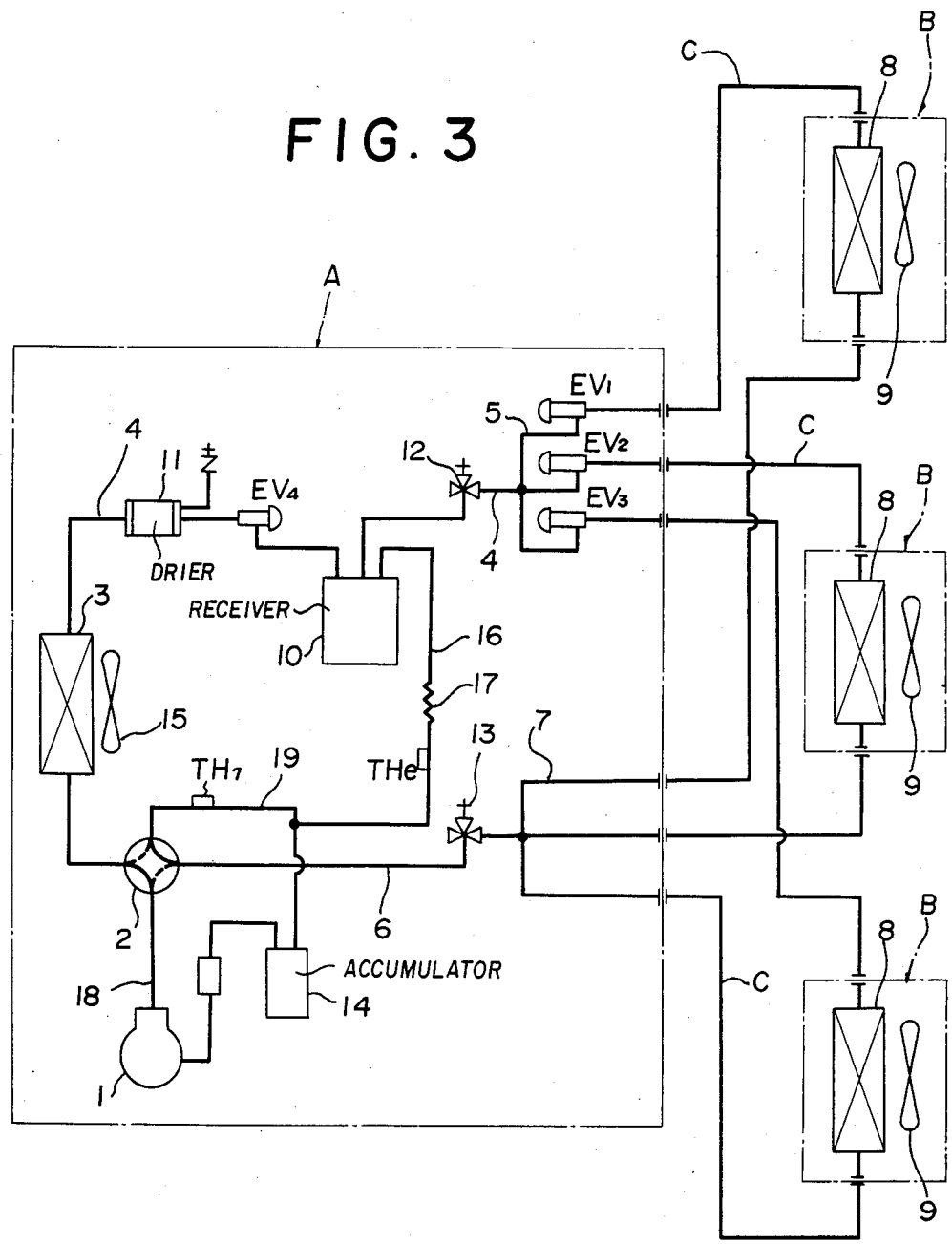
FIG. 3 is the refrigerant piping diagram showing a second embodiment of this invention.

Next, explanation will be given with respect to FIG. 4 regarding the control system of said No. 1 motorized valve $EV_1$-$EV_3$ and No. 2 motorized valve $EV_4$ constructed as described above.

The controller 30 is provided with a central processing unit CPU connecting a memory 31 consisting of ROM and RAM, and is connected at the input side to operation status sensing means 32 which senses how many indoor units B are operating, operation mode sensing means 33 which senses whether the units are in cooling or in heating, the target superheat setting means 34, room temperature sensor 35 for each indoor units B, and the No. 5 temperature sensor $TH_7$ and No. 2 temperature sensor $TH_e$ via A/D converter 36. Further, solenoid relay SV which changes over said 4-way valve is connected to output side via driver $D_1$, and said No. 1 motorized valve $EV_1$-$EV_3$ and No. 2 motorized valve $EV_4$ are connected to output side via multiplexer 37 and a plurality of pulse generating circuits 38-41 Also, fan-motor relays $F_1$-$F_3$ which control the fan-motor of each fan 9 of the indoor unit are connected to output side via driver $D_2$-$D_4$.

Moreover, the central processing unit CPU of said controller 30 has controlling function which constitutes means for controlling said No. 1 motorized valve EV- $EV_1$-$EV_3$ corresponding to the operating indoor unit B at a given opening in accordance with the number of operating indoor units and means for controlling the No. 1 motorized valve $EV_1$-$EV_3$ corresponding to the non-operating indoor unit B so as to completely close in cooling and control at a small opening in heating by stopping the fan 9 of the non-operating indoor unit B simultaneously.

Next, the explanation will be given about the operation of said No. 1 motorized valve $EV_1$-$EV_3$ and No. 2 motorized valve $EV_4$ in accordance with the flow charts shown in FIGS. 5 and 6.

Figure 5:
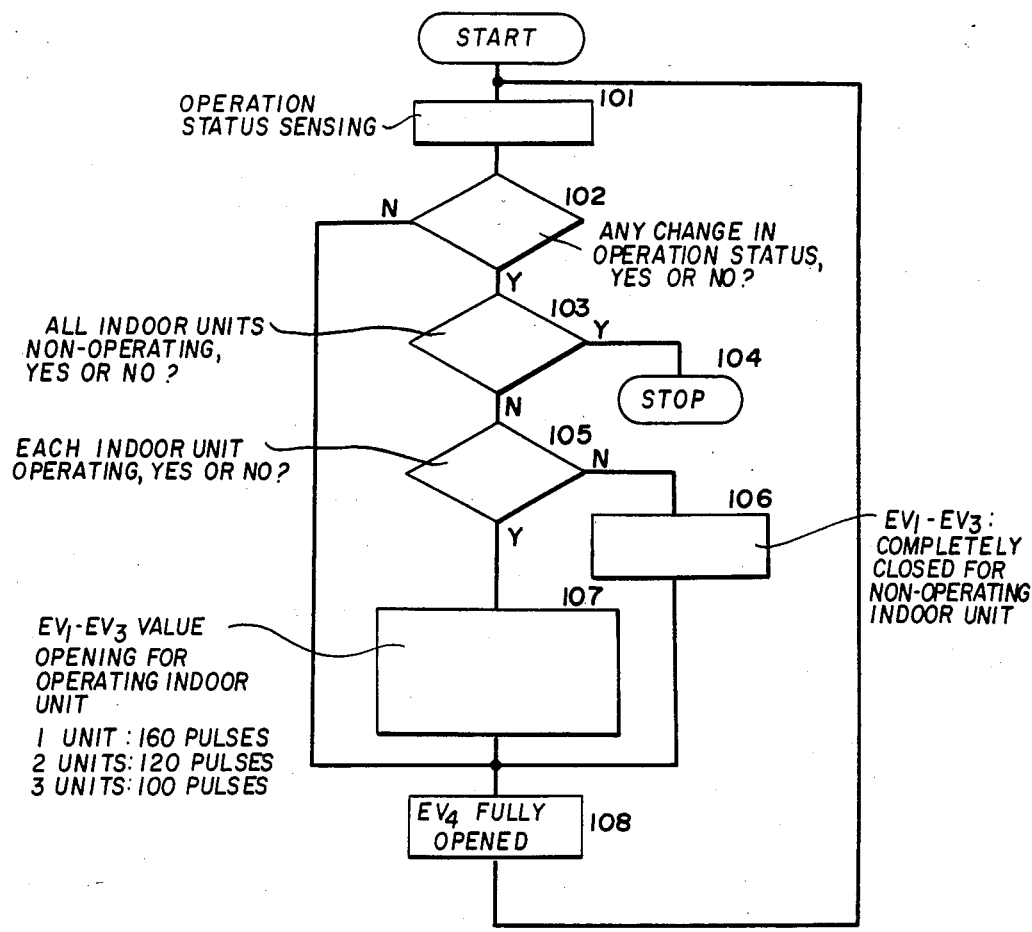
FIG. 5 is the flow chart for cooling operation.

FIG. 5 is the flow chart for cooling, which starts with sensing cooling operation by means of the operation mode sensing means 33. Next, by means of operation sensing means 32, the number of operating indoor units B and operation or non-operation of each indoor unit B is checked—operation status sensing (step 101) and then whether there are any changes in the operation is checked (step 102). In case all indoor units B stop or rest by the shutdown of compressor 1 by the operation of room temperature sensors 35 of each indoor unit B or the operation switch, control of No. 1 and No. 2 motorized valves $EV_1$-$EV_3$, $EV_4$ is discontinued (step 103, 104). When any indoor unit B is operating, No. 1 motorized valves $EV_1$-$EV_3$ corresponding to the non-operating units are completely closed (step 106) and No. 1 motorized valve $EV_1$-$EV_3$ corresponding to the operating unit is controlled at a predetermined opening in accordance with said pulse number changing with the number of operating indoor units B(step 107). In cooling, No. 2 motorized valve $EV_4$ is fully opened (step 108).

Figure 6:
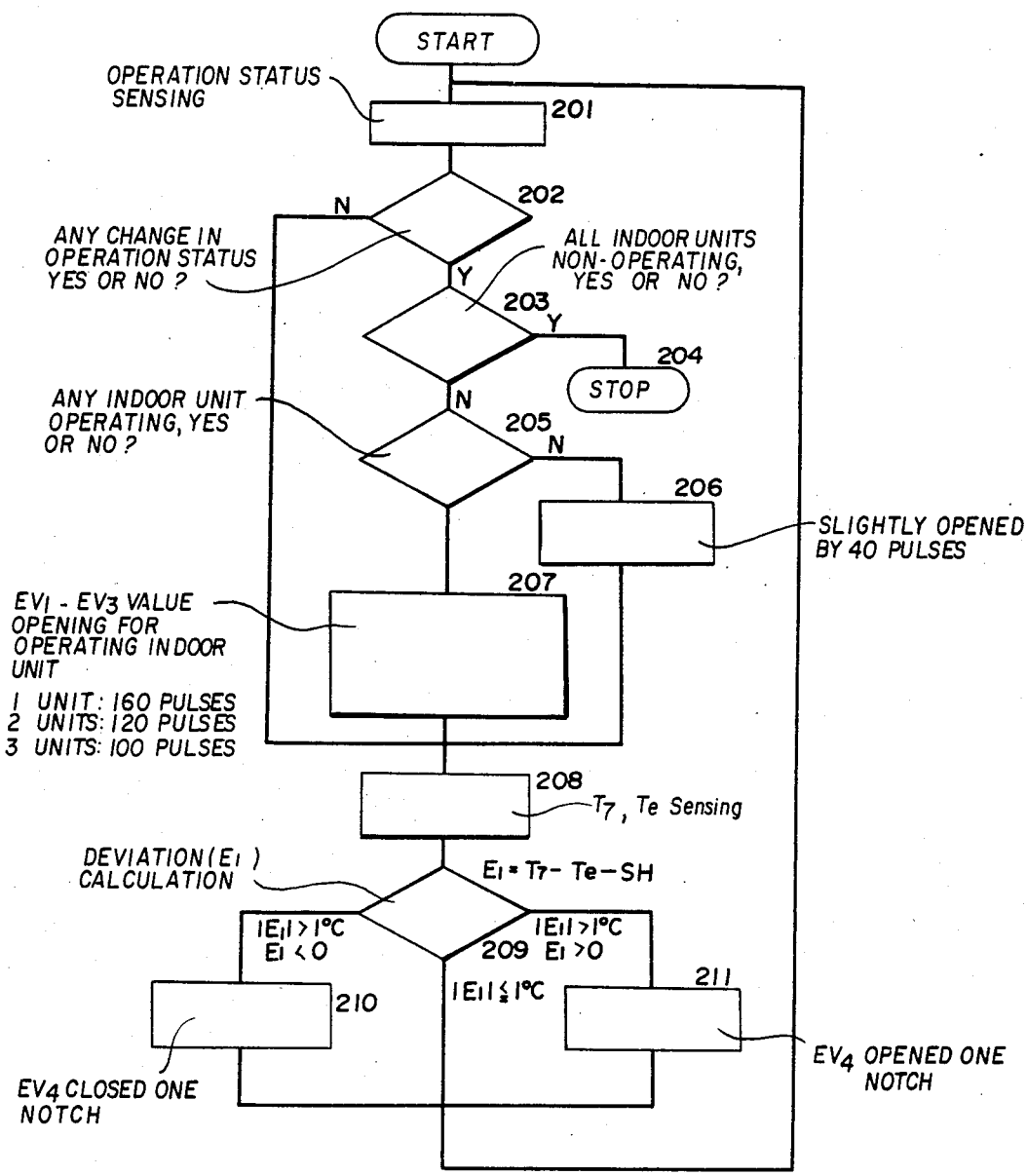
FIG. 6 is the flow chart for heating operation.
Figure 7:
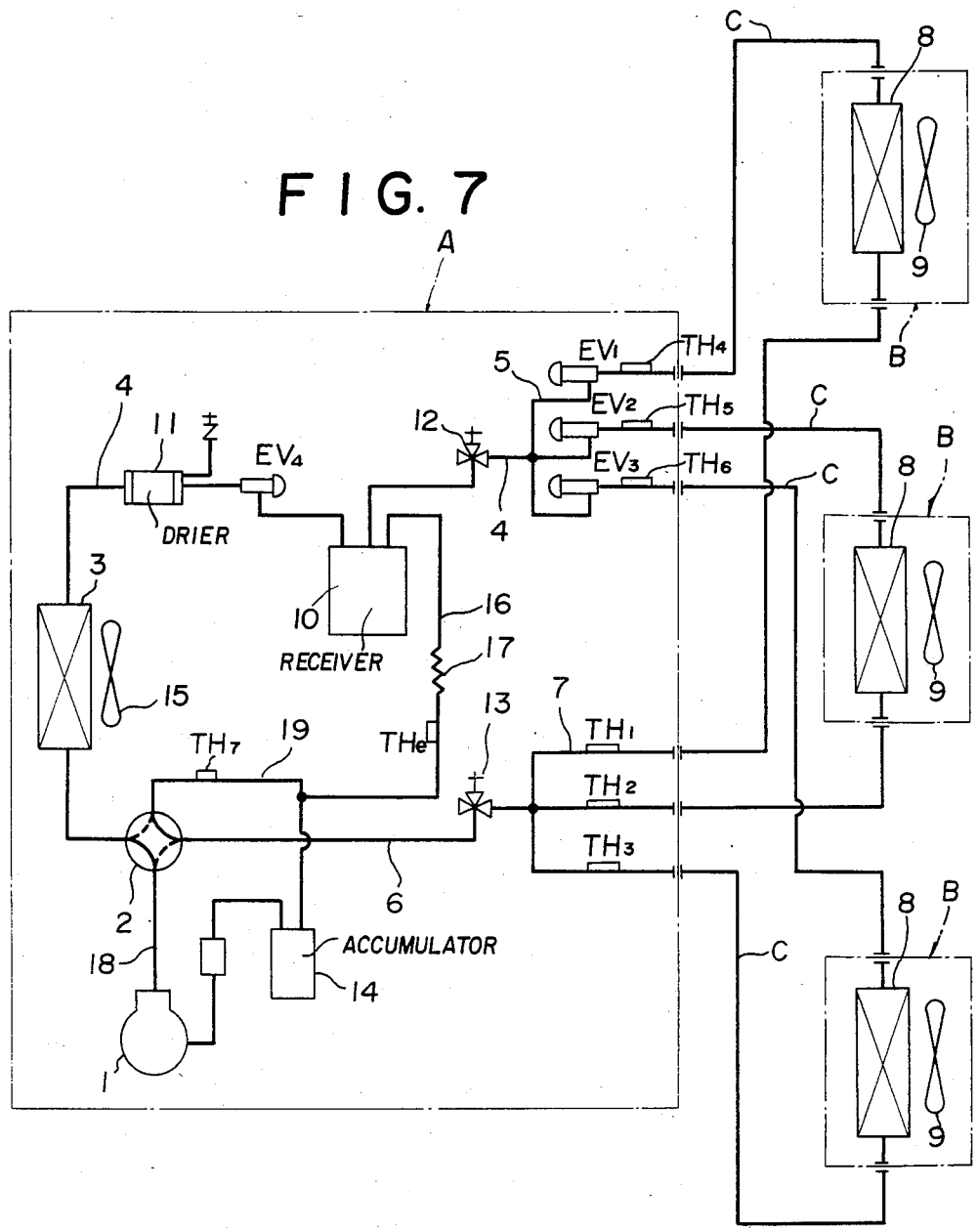
FIG. 7 is the refrigerant piping diagram showing a third embodiment of this invention.

FIG. 6 is the flow chart for heating, which starts with sensing heating operation as for cooling. After the number of the operating indoor units B and the operation or non-operation of each indoor unit B is checked and thus the operation status is checked out (step 201), whether or not there is any change in the operation status is judged (step 202). In case all indoor units are closed or rest and the compressor 1 stops, said No. 1 and No. 2 motorized valves $EV_1$-$EV_3$, $EV_4$ are cut off of control thereof (step 203, 204). When any indoor unit B is operating, No. 1 motorized valve $EV_1$-$EV_3$ is controlled at a given opening in accordance with the pulse number changing with the number of operating indoor units B (step 207). In this stage of heating, low pressure gaseous refrigerant temperature $T_7$ passing through said suction line 19 and the saturation temperature of this low pressure gaseous refrigerant $T_e$ are sensed respectively by No. 5 temperature sensor $TH_7$ and No. 2 temperature sensor $TH_e$ (step 208). Said deviation $E_1$ is calculated out (step 209) and when the absolute value of this deviation $E_1$ is larger than 1° C. and said deviation $E_1$ is less than 0, said No. 2 motorized valve $EV_4$ is closed by one predetermined notch (step 210) and when said deviation is more than 0, said No. 2 motorized valve $EV_4$ is opened by one predetermined notch and thereby the deviation $E_1$ of said low pressure gaseous refrigerant superheat can be controlled within ±1° C. of the target superheat SH which is set to have 0°-3° C. at the outlet of the source-side heat exchanger 3. In said No. 2 embodiment, besides the above-stated control, No. 2 motorized valve $EV_4$ may be controlled, in heating, at a predetermined opening so as to obtain appropriate superheat.

Furthermore, while No. 2 motorized valve $EV_4$ is fully opened in cooling in the second embodiment, said motorized valve $EV_4$ may operate so as to control sub-cool of high pressure liquid refrigerant at the source-side heat exchanger 3 outlet in cooling and an externally equalizing or internally equalizing expansion valve is also applicable to the sub-cool control.

Next, explanation will be given of a third embodiment shown in FIG. 7 through FIG. 10.

Figure 8:
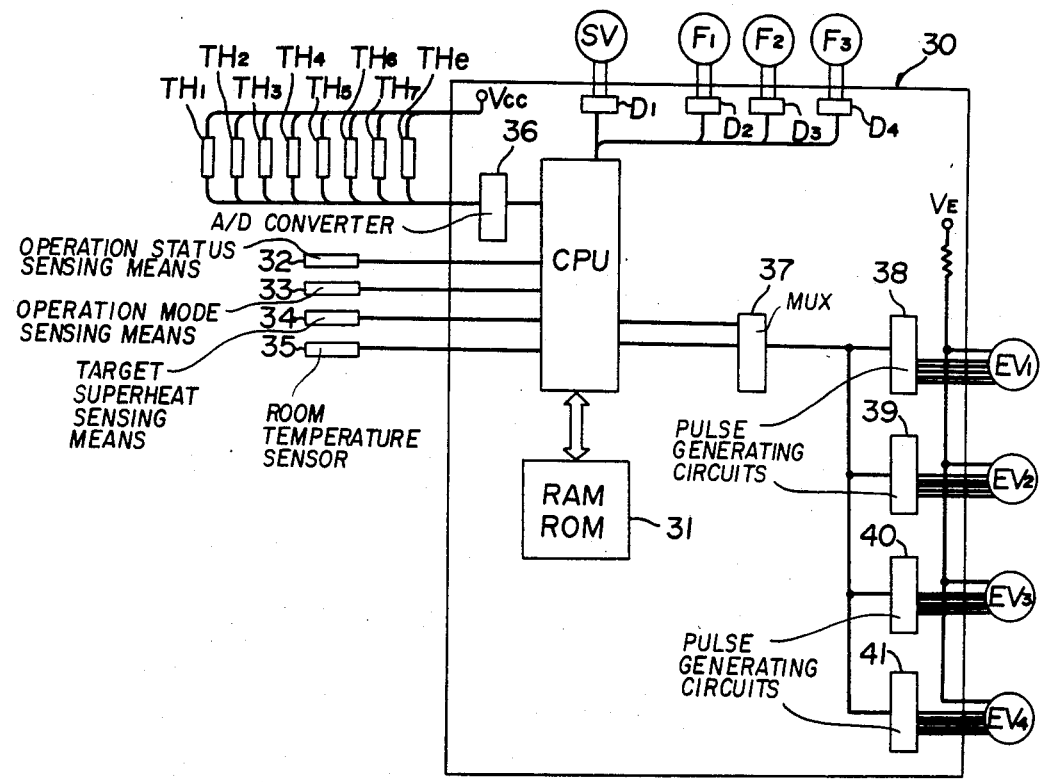
FIG. 8 is the schematic drawing showing the outline of the controller thereof.

The refrigerant piping system of the third embodiment is basically the same as that of the second embodiment and the difference is like that of the first embodiment shown in FIG. 1. No. 1 temperature sensors $TH_1$-$TH_3$ are mounted respectively on each gaseous line branch in order to sense low pressure gaseous refrigerant temperature $T_1$-$T_3$ at each use-side heat exchanger 8 outlet in cooling, and No. 3 temperature sensors $TH_4$-$TH_6$ are mounted on each liquid line branch in order to sense high pressure liquid refrigerant temperature at each use-side heat exchanger 8 outlet in heating. The control system which controls No. 1 motorized valve $EV_1$-$EV_3$ mounted on each liquid line branch 5 and No. 2 motorized valve $EV_4$ mounted on the liquid line main 4 for controlling superheat of low pressure gaseous refrigerant at the source-side heat exchanger 3 outlet in heating is basically the same as that of the second embodiment shown in FIG. 4. The difference is the following additional hook-up so constructed that, as shown in FIG. 8, on the input side of central processing unit CPU of said controller 30, said No. 1 and No. 3 temperature sensors $TH_1$-$TH_6$ are connected and said central processing unit CPU including a controlling function which constitutes the following four means:

(1) Means controlling No. 1 motorized valves $EV_1$-$EV_3$ corresponding to the operating indoor unit in accordance with the sensing result of said operation status sensing means 22 so as to open, initially, at a predetermined opening and for a predetermined time (for example, 3 minutes) depending upon the number of the operating indoor unit B, (2) Means for calculating means temperature Tm of high pressure liquid refrigerant temperature $T_4$-$T_6$ sensed by said No. 3 temperature sensors $TH_4$-$TH_6$, that is, high pressure liquid refrigerant temperature $t_4$-$T_6$ flowing through said liquid line branches 5 from the operating indoor unit B, (3) Means for comparing said mean temperature Tm with said high pressure liquid refrigerant temperature $T_4$-$T_6$ and controlling No. 1 motorized valve $EV_1$-$EV_3$ corresponding to the operating unit B so as to make high pressure liquid refrigerant temperature $T_4$-$T_6$ at the use-side heat exchanger outlet of each operating indoor unit B close to said mean temperature Tm, (4) Means for comparing, in heating and with the non-operating indoor unit B, each high pressure liquid refrigerant temperature $T_4$-$T_6$ with said mean temperature Tm and controlling No. 1 motorized valve $EV_1$-$EV_3$ corresponding to the non-operating indoor unit B so as to modulate said predetermined opening to the opening side when high pressure liquid refrigerant temperature at the use-side heat exchanger outlet of the non-operating indoor unit B is lower than said mean temperature Tm.

Next, explanation will be given concerning operation of said No. 1 motorized valve $EV_1$-$EV_3$ and No. 2 motorized valve $EV_4$ in accordance with the flow charts shown in FIG. 9 and FIG. 10.

Figure 9:
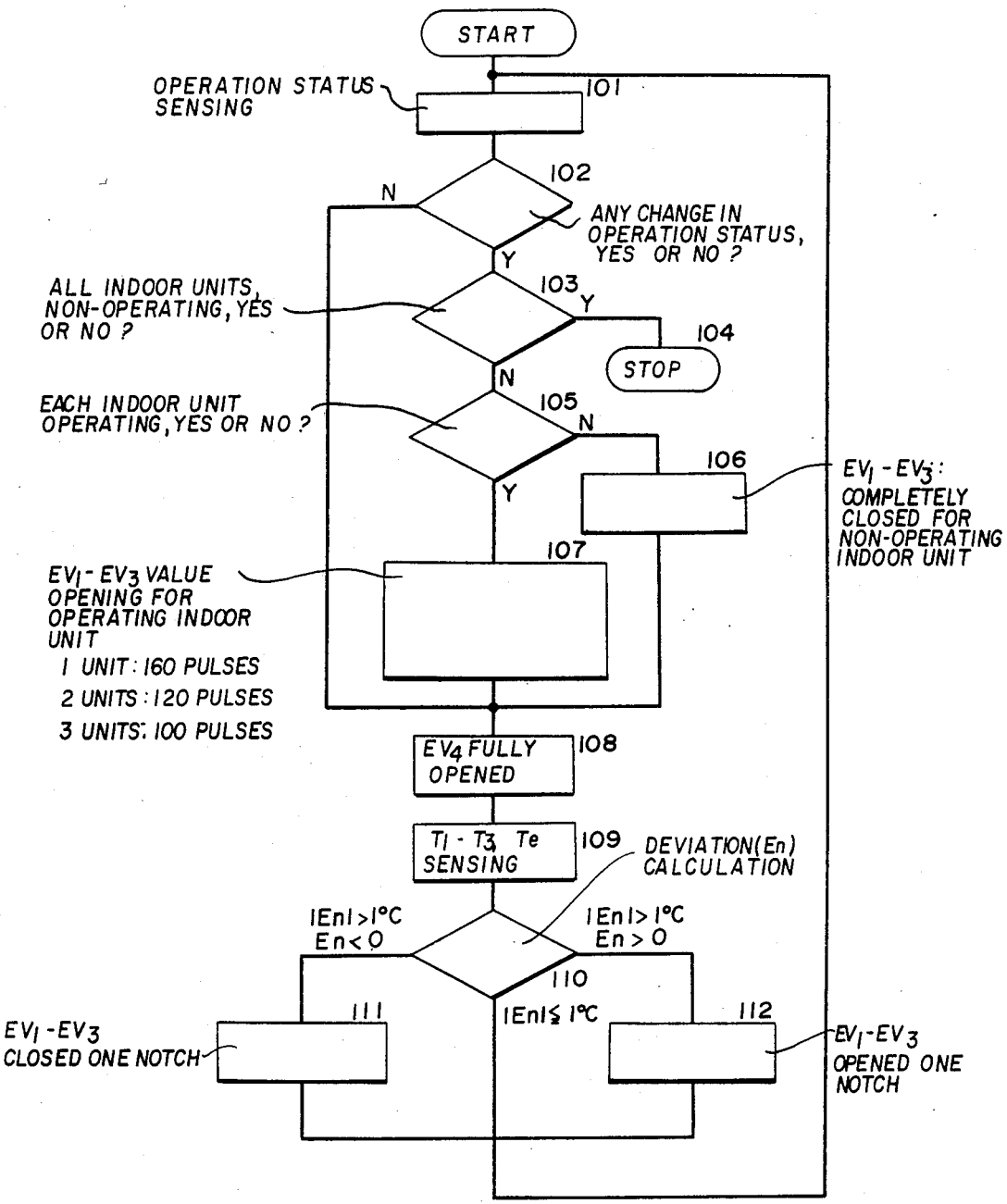
FIG. 9 is the flow chart for cooling operation.
Figure 10:
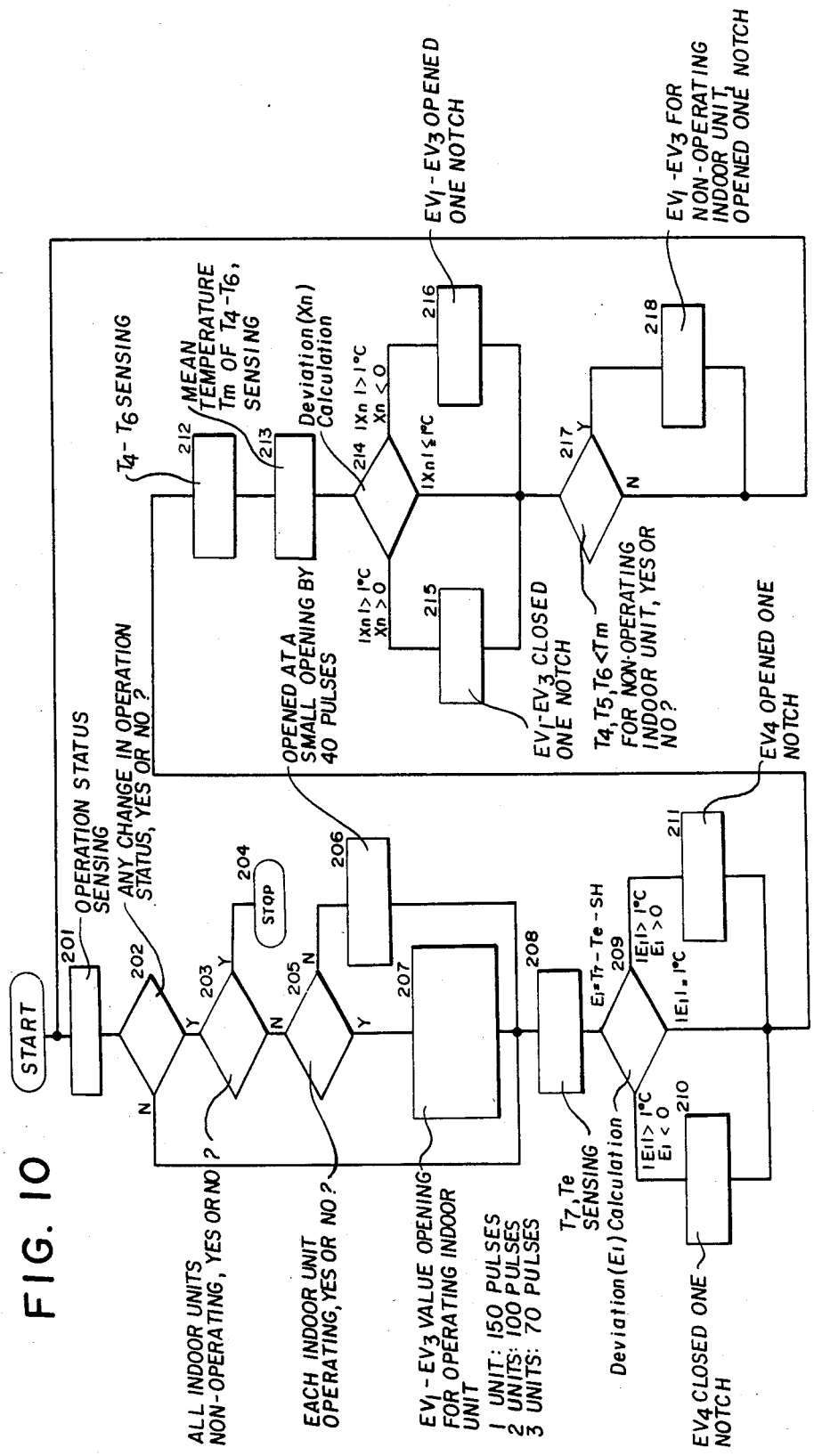
FIG. 10 is the flow chart for heating operation.

In these flow charts, the operation of No. 1 motorized valve $EV_1$-$EV_3$ in case of all indoor units B being non-operative or any indoor unit B being non-operative and the operation of No. 2 motorized valve $EV_4$ in heating are the same as those of the second embodiment and therefore the explanation thereof is omitted (in FIG. 9, step 101-106, 108; in FIG. 10, step 201-206, 208-211). When any indoor unit B is operating, the number of the operating indoor unit B is checked at the operation start and No. 1 motorized valve $EV_1$-$EV_3$ corresponding to the operating indoor unit B is controlled at a predetermined opening and for a certain time by the pulse number in accordance with the number of the operating indoor units (step 107, 207). This control operation is the same for both cooling and heating. After said certain time, the operation is conducted as follows: In cooling, as shown in the flow chart of FIG. 9, the temperatures of low pressure gaseous refrigerant $T_1$-$T_3$ flowing through said gas line branches 7 from the operating indoor unit B are sensed by No. 1 temperature sensors $TH_1$-$TH_3$ (step 109) and saturation temperature Te of low pressure gaseous refrigerant is sensed by said No. 2 temperature sensor $TH_e$ (step 109). From said low-pressure gaseous refrigerant temperature $T_1$-$T_3$ and said saturation temperature $T_3$ thereof, the deviation $E_n$ against the target superheat $SH_o$ is calculated by the formula, $E_n=(T_1,T_2,T_3)-T_e-SH_o$ (step 110). When the absolute value of said deviation $E_n$ is larger than 1 and said deviation $E_n$ is negative, No. 1 motorized valve $EV_1$-$EV_3$ corresponding to the operating indoor unit B is modulated one predetermined notch towards the closing side (step 111). When said deviation $E_n$ is positive and larger than 1, said No. 1 motorized valve $EV_1$-$EV_3$ is modulated one predetermined notch towards the opening side (step 112). Thereby, the deviation $E_n$ can be controlled within $\pm 1°$ C. of the target superheat $SH_o$ of $0°$-$3°$ C. at each useside heat exchanger 8 outlet.

Further, said No. 1 motorized valve $EV_1$-$EV_3$ is controlled by P. Control, P.D.Control or P.I.D.Control against said deviation $E_n$.

Next, in heating, as shown in the flow chart of FIG. 10, the temperatures of high pressure liquid refrigerant $T_4$-$T_6$ flowing through said liquid line branches from the operating indoor unit B are sensed by means of No. 3 temperature sensors $TH_4$-$TH_6$ (step 212). Next, mean temperature of high pressure liquid refrigerant Tm flowing through said liquid line branches is calculated from the sensing result of these temperature sensors $TH_4$-$TH_6$ (step 213). By comparing this mean temperature Tm with each said high pressure liquid refrigerant temperature $T_4$-$T_6$, the deviation $X_n$, that is, $X_n=(T_4,T_5,T_6)-Tm$, is calculated (step 214). When said deviation is positive and larger than 1, No. 1 motorized valve corresponding to the operating indoor unit B is modulated one predetermined notch towards the closing side (step 215) and when said deviation $X_n$ is negative and the absolute value thereof is larger than 1, said No. 1 motorized valve is modulated one predetermined notch towards the opening side (step 216). Thereby the high pressure liquid refrigerant temperature $T_4$-$T_6$ at each use-side heat exchanger 8 outlet can be maintained within $\pm 1°$ C. of said mean temperature.

Further, while the opening control of said motorized valve $EV_1$-$EV_3$ is conducted by P Control, PD Control or PID Control against said devaitation $X_n$, the minimum pulse number towards the closing side is set at about 50 pulses and the maximum pulse number at about 200 pulses.

In the non-operating indoor unit B, high pressure gaseous refrigerant flowing from gaseous line branches 7 and condensing in the use-side heat exchanger by natural radiation does not usually cause liquid accumulation because of a given small opening of No. 1 motorized valve $EV_1$-$EV_3$ corresponding to the non-operating indoor unit B. However, when the ambient temperature of the non-operating unit B falls, for some reasons, down to the temperature of outdoor air, natural radiation at the use-side heat exchanger of said unit B increases greatly, which results in rapid liquid refrigerant accumulation in the circuit between said use-side heat exchanger 8 and No. 1 motorized valve $EV_1$-$EV_3$ because no solenoid valve is mounted on gaseous line 7 to shut off refrigerant flow. In this case, since No. 1 motorized valve $EV_1$-$EV_3$ is opened at a small opening and therefore the refrigerant flow rate through said circuit is very small, liquid refrigerant sub-cool increases rapidly.

For this reason, high pressure liquid refrigerant temperature $T_4$-$T_6$ for the non-operating indoor unit B is sensed by means of No. 3 temperature sensor $TH_4$-$TH_6$ mounted on said liquid line branches 5 and compared with said mean temperature Tm (step 217). When said high pressure liquid temperature $T_4,T_5,T_6$ is lower than said mean temperature Tm, since this means liquid refrigerant accumulation, No. 1 motorized valve $EV_1$-$EV_3$ corresponding to the non-operating indoor unit B is controlled so as to open one predetermined notch (step 218). In this case, the modulation of the valve opening is conducted progressively by a small number of pulses such as 5 pulses and the lower limit of said modulation is set at said 40 pulses and the upper limit at 70 pulses.

In above controlled third embodiment, it is possible to control adequately, in cooling, superheat at the use-side heat exchanger 8 outlet of the operating indoor unit B and level, in heating, sub-cool at the use-side heat exchanger 8 outlet of the operating indoor unit B and thus reduce refrigerant drift into each operating indoor unit B. When connection pipes connecting each indoor unit B with the outdoor unit differ in length and installed locations of said indoor units differ in the sea level height, refrigerant drift takes place because of different piping resistance. For example, in the case of large piping resistance, flow rate becomes smaller and sub-cool increases. In the third embodiment, however, No. 1 motorized valve $EV_1$-$EV_3$ is modulated on the opening side for the indoor unit B of larger piping resistance and on the closing side for the indoor unit B of smaller piping resistance so that the flow rate, at the No. 1 motorized valve $EV_1$-$EV_3$, modulated on the opening side, becomes larger and sub-cool is lessened. Therefore, it is possible to reduce refrigerant drift and optimize capacity distribution to each indoor unit B even when the system is subjected to the causes of refrigerant drift such as different piping resistance; and further since sub-cool at the use-side heat exchanger 8 outlet of each indoor unit is made close to the predetermined value, it is possible to operate the system efficiently, improving EER. Further, since No. 1 motorized valve $EV_1$-$EV_3$ corresponding to the non-operating indoor unit B is modulated in comparison of said high pressure liquid refrigerant temperature $T_4$-$T_6$ with said mean temperature Tm, liquid refrigerant accumulation in the non-operating indoor unit B can be prevented for certainty and thereby capacity drop due to shortage of circulating refrigerant can be eliminated.

Figure 11:
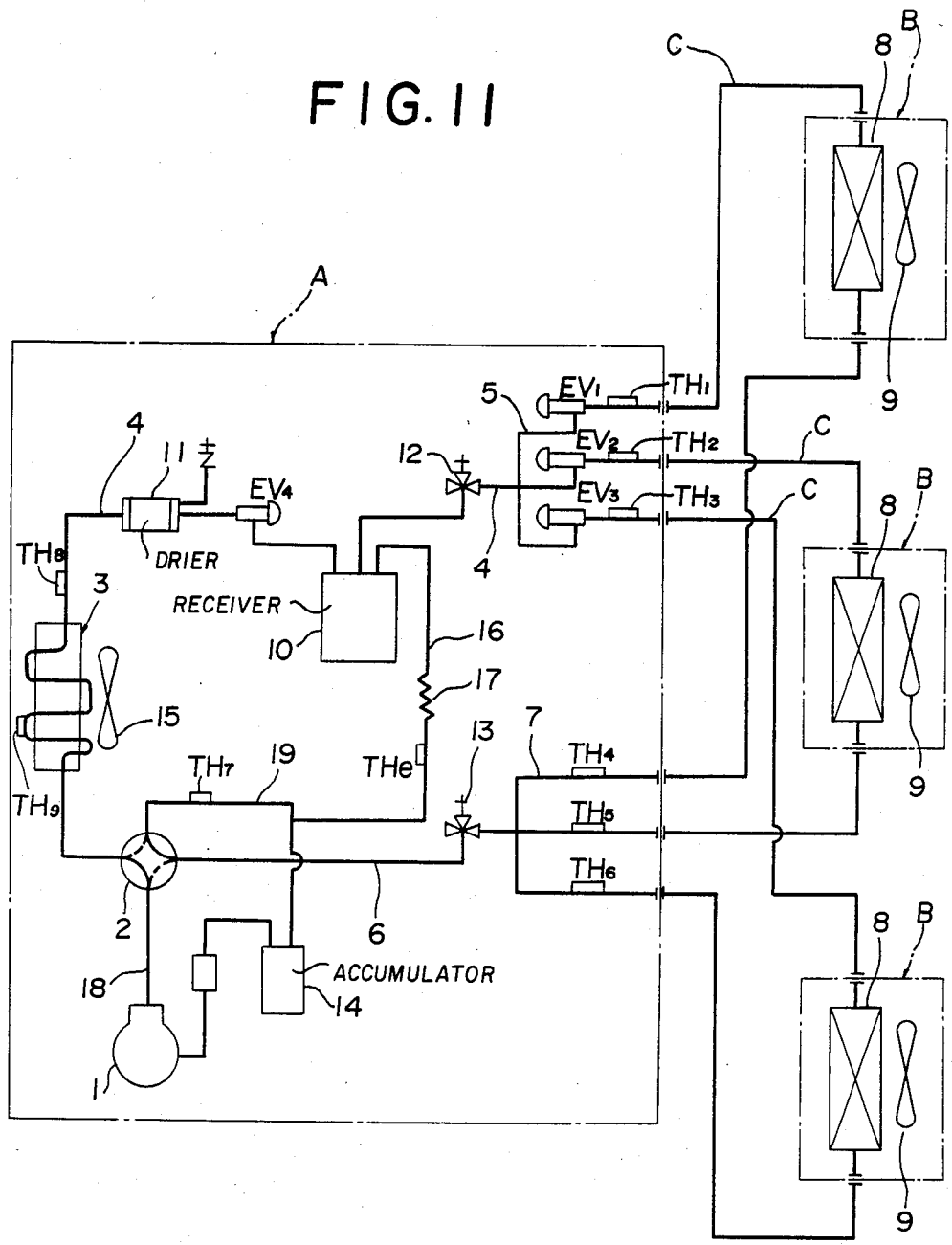
FIG. 11 is the refrigerant piping diagram showing a fourth embodiment of this invention.
Figure 12:
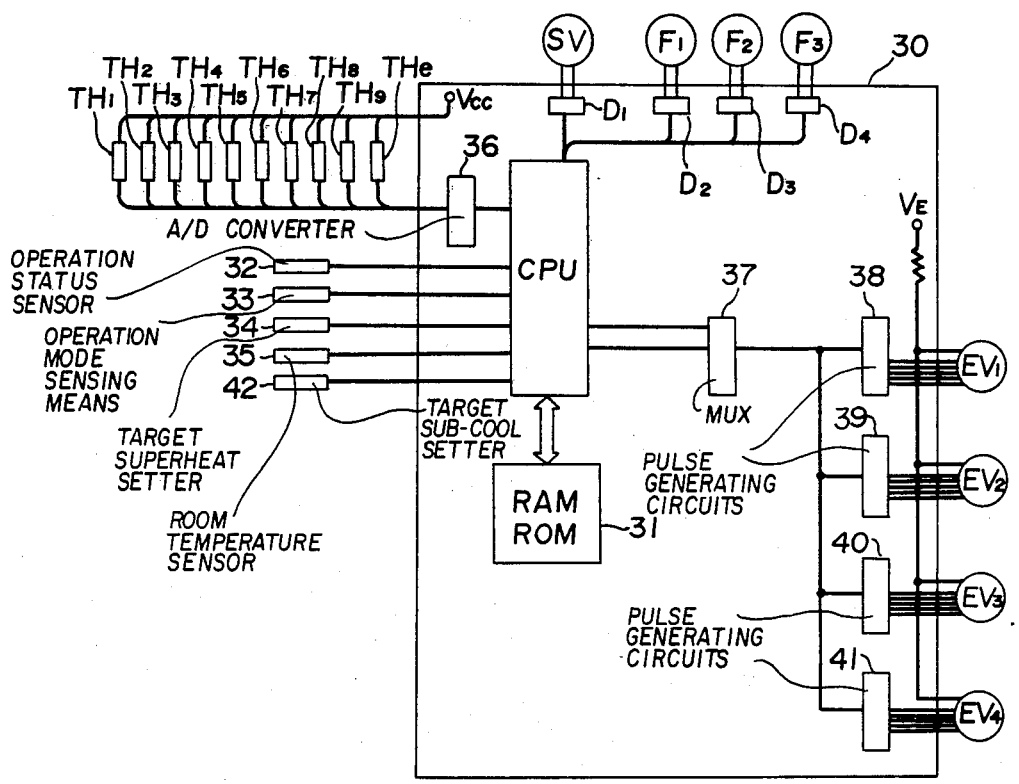
FIG. 12 is the schematic drawing showing the outline of the controller thereof and FIG. 13 the flow chart for cooling operation thereof.

Next, explanation will be given of the fourth embodiment in accordance with FIG. 11. The refrigerant piping system of the fourth embodiment is basically the same as those of the second and third embodiments shown in FIG. 3 and FIG. 7, respectively. The difference is that in the third embodiment shown in FIG. 7, No. 6 temperature sensor $TH_8$ and No. 7 temperature sensor $TH_9$ are provided, on the liquid line 4, in order to sense respectively, high pressure liquid refrigerant temperature $T_8$ at the source-side heat exchanger 3 outlet and condensing temperature $T_c$ therein and thereby sub-cool is also controlled using said No. 2 motorized valve $EV_4$. Therefore, the control system for No. 1 motorized valve $EV_1$–$EV_3$ and No. 2 motorized valve differs, as shown in FIG. 12, from the control system of the second embodiment in that said No. 6 and No. 7 temperature sensors $TH_8$, $TH_9$ and the target sub-cool SC setter 42 are connected to the input side of said controller 20 and a control means is incorporated in said central processing unit in order to compare said high pressure liquid refrigerant temperature $T_8$ sensed by said No. 6 temperature sensor $TH_8$ and said condensing temperature $T_c$ sensed by No. 7 temperature sensor $TH_9$ with the temperature $T_{sc}$ satisfying the target sub-cool SC set by said sub-cool setter 42 and modulate No. 2 motorized valve $EV_4$ so as to obtain said target sub-cool SC.

Figure 13:
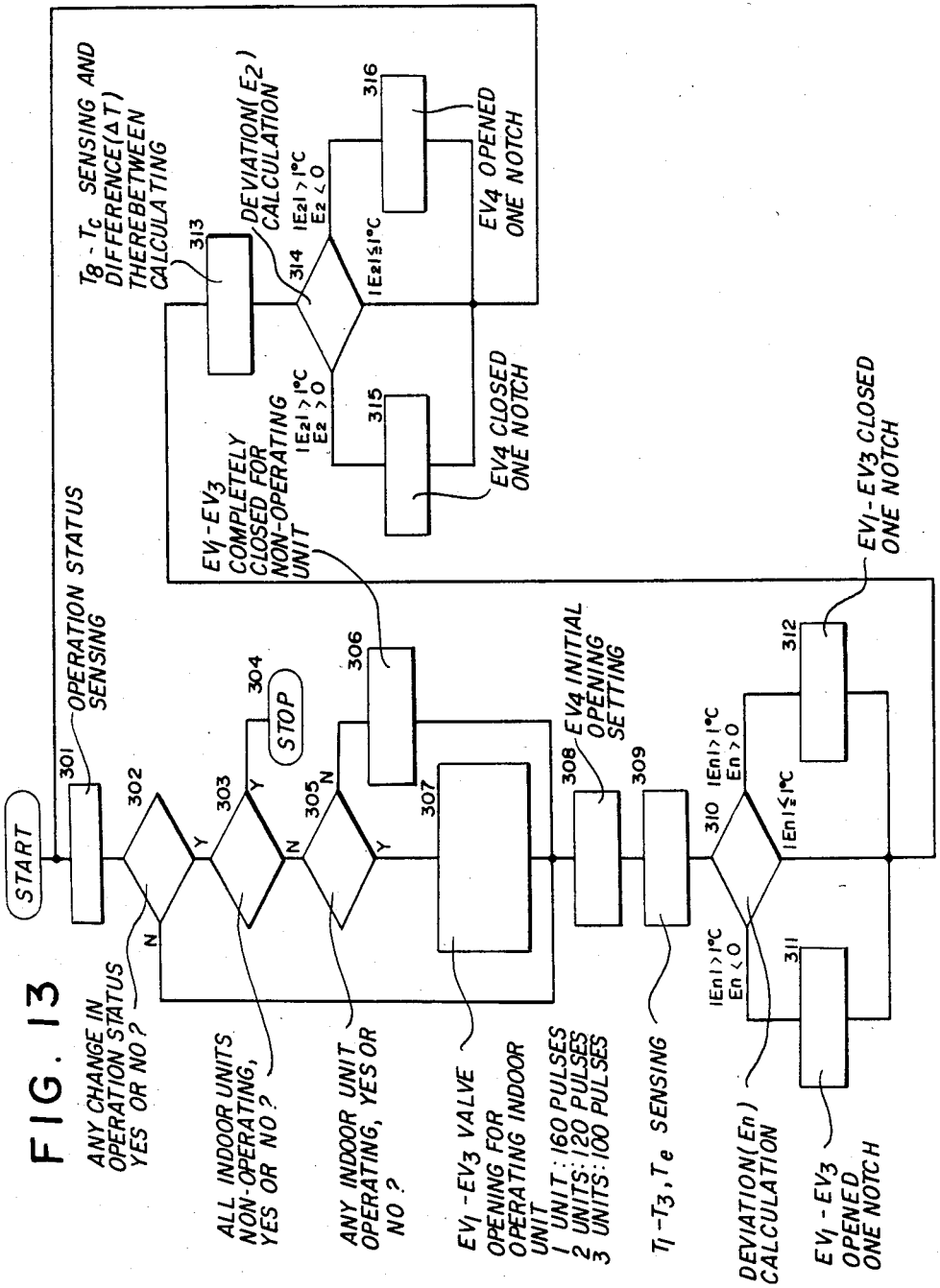

While the control of No. 1 motorized valve $EV_1$–$EV_3$ in the fourth embodiment constructed as described above is the same as that of the third embodiment (step 301–307, step 309–312), the control of No. 2 motorized valve $EV_4$ in cooling is different and therefore only the difference will be explained in accordance the flow chart of FIG. 13.

That is, after being set at the start of operation to open at a predetermined opening and for a certain time (for example, 3 minutes), No. 2 motorized valve $EV_4$ is controlled as follows: By sensing high pressure liquid temperature $T_8$ at the source-side heat exchanger 3 outlet by No. 6 temperature sensor $TH_8$ and condensing temperature $T_c$ by No. 7 temperature sensor $TH_9$, sub-cool ($\Delta T = T_c - T_8$) is calculated (step 313) and the deviation ($E_2 = T_{sc} - \Delta T$) is calculated by comparing said sub-cool ($\Delta T$) with the temperature $T_{sc}$ satisfying said target sub-cool SC (step 314). When the deviation $E_2$ is positive and the absolute value thereof larger than 1, said No. 2 motorized valve $EV_4$ is modulated so as to close one notch (step 315) and when it is negative and the absolute value thereof larger than 1, said No. 2 motorized valve $EV_4$ is modulated so as to open one notch (step 316) and thereby sub-cool of said high pressure liquid refrigerant is maintained within $\pm 1°$ C. of the target sub-cool by controlling pulse input into No. 2 motorized valve $EV_4$. Instead of step 313–step 316, No. 2 motorized valve $EV_4$ control may be conducted by first controlling input pulse number (for example, 180 pulse) so as to obtain the proper opening.

In the fourth embodiment, it is possible to achieve proper sub-cool control in cooling as well as the effect obtained in the third embodiment and thereby improve cooling capacity and EER.

Figure 14:
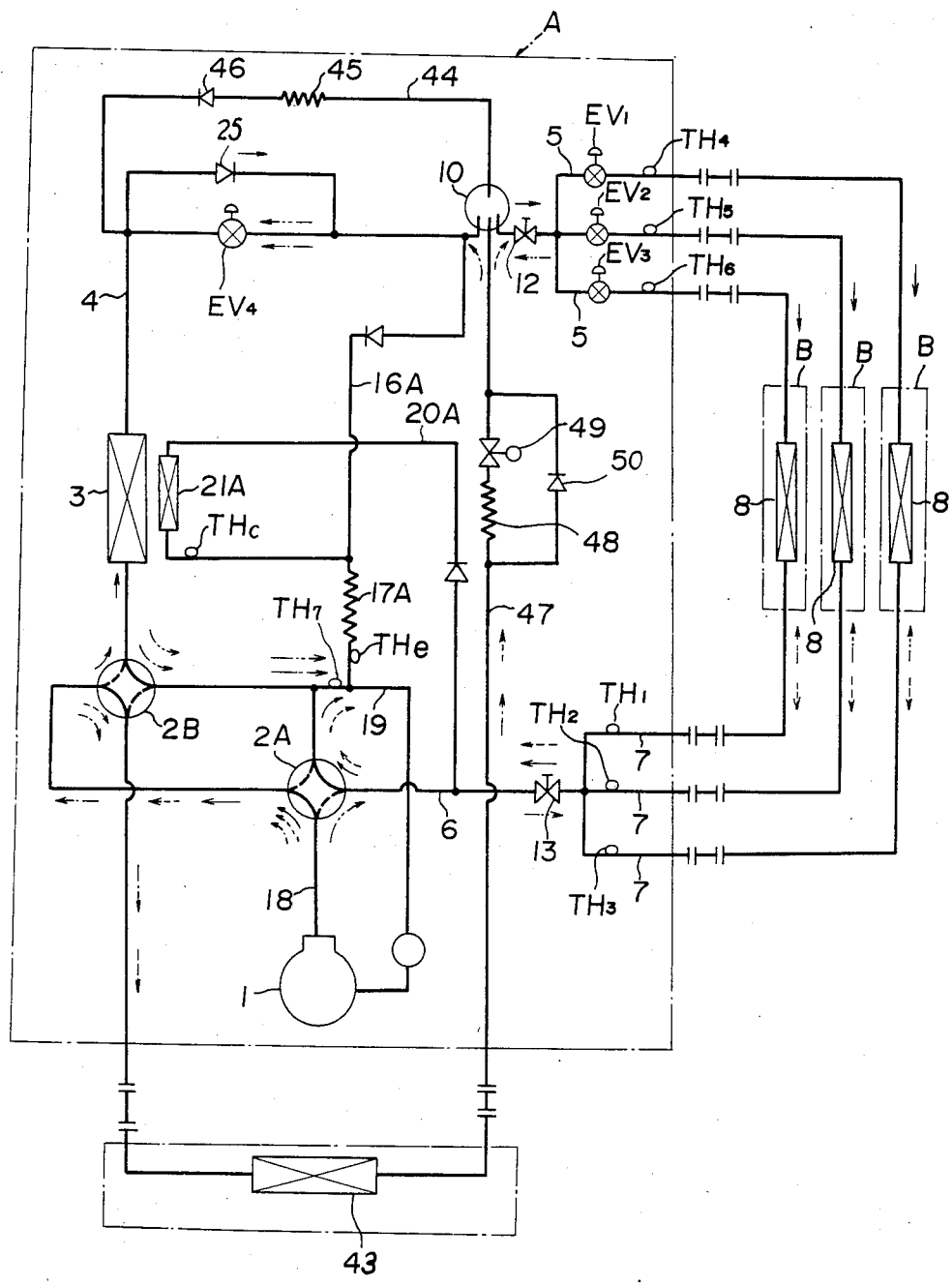
FIG. 14 is the refrigerant piping diagram showing a fifth embodiment of this invention and FIG. 15 is the refrigerant piping diagram for the conventional system of prior art.
Figure 15:
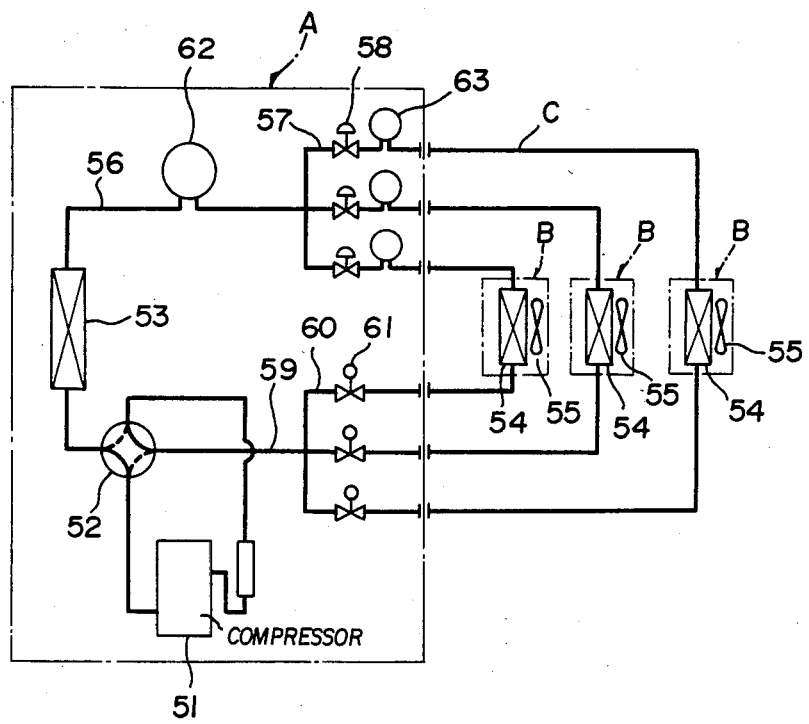

Finally, a fifth embodiment is be explained with reference to FIG. 14. The fifth embodiment shown in FIG. 14 is basically the same as the first embodiment and the difference with the first embodiment lies in that a parallel circuit of No. 2 motorized valve $EV_4$ and a check valve 25 is, as with the second embodiment, provided on said liquid line main 4 to control low pressure gaseous refrigerant superheat at the source-side heat exchanger 3 outlet in heating, two 4-way valves, i.e., No. 1 and No. 2 4-way valves 2A, 2B, are provided, a domestic hot water supply heat exchanger 43 provided between No. 2 four-way valve and a receiver 10, No. 1 sensing circuit 16A having a pressure reducing mechanism 17A provided between said liquid line main 4 and suction line 19, and further No. 2 sensing circuit 20A having a sensing heat exchanger 21A provided with one end connected to the line connecting said pressure reducing mechanism 17A with said liquid line main 4 and the other end to the gaseous line main 6.

Further, said No. 1 temperature sensor $TH_1$–$TH_3$ is mounted on each gaseous line branch 7, and No. 2 temperature sensor $TH_e$ is mounted on the suction pipe 19 connection side of said No. 1 sensing circuit 16A. No. 4 temperature sensor $TH_c$ is mounted between said sensing heat exchanger 21A and pressure reducing mechanism 17A. Low pressure gaseous refrigernat superheat at each use-side heat exchanger 8 outlet is controlled, in cooling, by controlling the opening of No. 1 motorized valve $EV_1$–$EV_3$ according to the sensing results of said No. 3 and No. 4 temperature sensors, and further high pressure liquid refrigerant sub-cool at each use-side heat exchanger 8 outlet is controlled, in heating and upon a operation for domestic hot water supply, by controlling the opening of No. 2 motorized valve $EV_4$ according to the sensing results of said No. 2 temperature sensor $TH_e$ and No. 5 temperature sensor $TH_7$ mounted on the suction line 19. Further in FIG. 14, numeral 44 represents a purging passage for gaseous refrigerant in the receiver 10, and incorporates a capillary 45 and a check valve 46. Numeral 47 represents a domestic hot water supply passage incorporating a capillary tube 48 and a solenoid valve 49 and a check valve 50 mounted in parallel with said capillary tube 48 and solenoid valve 49.

By changing over said 4-way valves 2A,2B, refrigerant is passed for cooling as indicated by the full line arrow, for cooling and domestic hot water supply as indicated by the dotted line arrow, for domestic hot water supply as indicated by the chain line arrow and for heating as directed by the double chain line arrow.

In the above-described first through fifth embodiments, while 3 indoor units B are connected to one outdoor unit A, 2 indoor units B or 4 indoor units are also applicable. Further, in the first, third, fourth and fifth embodiments, while said No. 3 temperature sensors $TH_4$–$TH_6$ are mounted on each liquid line branch 5, said sensors may be also mounted at each use-side heat exchanger 8 outlet of each indoor units B in heating. While No. 1 temperature sensors $TH_1$–$TH_3$ mounted on each gaseous line branch may be also mounted at each use-side heat exchanger 8 outlet of each indoor units B in cooling, said mounting on the gaseous line branch 7, together with mounting No. 2 temperature sensor $TH_e$ for sensing low pressure gaseous refrigerant saturation temperature $T_e$ on said sensing circuit 16, 16A of the outdoor unit A, eliminate the necessity of wiring between the outdoor and indoor units for signal transmission, and thereby simplifies wiring between the outdoor and indoor units.

While several embodiments of the invention have been shown and described, the invention is not limited to the specific constructions thereof, which are merely provided as examples in the specification rather than being defined or limited.

What is claimed is:

1. A multi-room type air-conditioner comprising an outdoor unit which has a compressor, a source-side heat exchanger and a 4-way valve with high or low pressure change-over ports, a plurality of indoor units each of which has a use-side heat exchanger and a fan attached thereto, and a plurality of connection pipes which connect said each indoor unit with said outdoor unit and capable of providing cooling and heating by change-over of said 4-way valve, said multi-room type air-conditioner comprising:

a liquid line main connected to said source-side heat exchanger and passing liquid refrigerant, a plurality of liquid line branches branching out from said liquid line main and connected to said connection pipes, a gaseous line main connected to one of a high and a low pressure change-over port and passing gaseous refrigerant, a plurality of gaseous line branches branching out from said gaseous line main and connected to said connection pipes, a plurality of motorized valves mounted on said liquid line branches, an amount of opening of each said motorized valve being controllable within a range from a completely closed position to a fully opened position, a means for controlling superheat of low pressure gaseous refrigerant at an outlet of said use-side heat exchanger of an operating indoor unit in the cooling mode by controlling an amount of opening of said motorized valves, a means for controlling sub-cool of high pressure liquid refrigerant at an outlet of said use-side heat exchanger in heating of the operating indoor unit, a means for completely closing, in cooling, a said motorized valve mounted on a said liquid line branch connected to a non-operating said indoor unit, a means for shutting down, in heating, a said fan mounted on the non-operating indoor unit, and a means for controlling at a small opening, in heating, said motorized valve mounted on the liquid line branch connected to the non-operating indoor unit.

2. A multi-room type air-conditioner according to claim 1, further comprising: an operation sensing means whereby operation or non-operation is checked by each indoor unit and the number of the operating indoor units is calculated; and a means of controlling said motorized valve mounted on the liquid line branch connected to the operating indoor unit at a predetermined opening amount, based upon the sensing result of said sensing means and in accordance with the number of the operating indoor units.

3. A multi-room type air-conditioner according to claim 1, further comprising an operation mode sensing means for sensing whether the air-conditioner is in cooling mode or in heating mode; an operation sensing means for checking the operation or nonoperation of each indoor unit and calculating the number of the operating indoor units; a liquid refrigerant temperature sensing means for sensing a high pressure liquid refrigerant temperature at said use-side heat exchanger outlet in heating of each indoor unit; a means for opening at a predetermined opening amount and for a certain time, at the start of heating, said motorized valve mounted on the liquid line branch connected to the operating indoor unit, based upon the sensing result of said operation sensing means and in accordance with the number of the operating indoor units; a means for calculating the mean temperature of the liquid refrigerant temperatures at the useside heat exchanger outlet in heating of each operating indoor unit, based upon the sensing result of said liquid temperature sensing means; first comparing means for comparing the sensing result of said liquid refrigerant temperature sensing means with said mean temperature of said liquid refrigerant temperatures; and a means for controlling, by the output of said first comparing means, motorized valves mounted on the liquid line branches connected to each operating indoor unit so as to bring the liquid refrigerant temperature at the use-side heat exchanger in heating of each operating indoor unit close to said mean temperature.

4. A multi-room type air-conditioner according to claim 3, further comprising second comparing means for comparing the sensing result of said liquid refrigerant temperature sensing means for the non-operating indoor unit in heating with said mean temperature; and a means for modulating, when the liquid refrigerant temperature at the use-side heat exchanger outlet in heating of the non-operating indoor unit is lower than said mean temperature, said motorized valve mounted on the liquid line branch connected to said non-operating indoor unit towards the opening side.

5. A multi-room type air-conditioner according to claim 1, further comprising an operation mode sensing means sensing whether the air-conditioner is in cooling mode or in heating mode; an operation status sensing means for sensing the operation or non-operation of each indoor unit and calculating the number of the operating indoor units; a temperature sensing means for sensing low pressure gaseous refrigerant temperature at said use-side heat exchanger outlet in cooling of each operating indoor unit; a means for controlling, at the start of cooling operation, the motorized valve mounted on said liquid line branch connected to the operating indoor unit so as to open at a predetermined opening amount for a certain time, based upon the sensing result of said gaseous refrigerant temperature sensing means; and a means for controlling superheat of low pressure gaseous refrigerant at the use-side heat exchanger outlet of each operating indoor unit by modulating the motorized valve mounted on the liquid line branch connected said each operating indoor unit, based upon the sensing result of said gaseous refrigerant temperature sensing means.

6. A multi-room type air-conditioner according to claim 1, further comprising an operation mode sensing means for sensing whether the air-conditioner is in cooling mode or heating mode; an operation status sensing means for sensing the operation or nonoperation of each indoor unit and calculating the number of operating indoor units; and a means for controlling, based upon the sensing results of said operation mode sensing means and said operation status sensing means, the motorized valve mounted on the liquid line branch connected to the non-operating indoor unit so as to completely close in cooling and open at a opening amount sufficiently small to admit refrigerant flow just condensing in the use-side heat exchanger of the non-operating indoor unit by natural radiation in heating.

7. A multi-room type air-conditioner according to claim 1, further comprising a superheat sensing means comprising first temperature sensors for sensing low pressure gaseous refrigerant temperature at the use-side heat exchanger outlet in cooling of each operating indoor unit and a first temperature sensing means for sensing the saturation temperature of said low pressure gaseous refrigerant; and a superheat controlling means for controlling superheat of low pressure gaseous refrigerant at the use-side heat exchanger outlet in cooling of each operating indoor unit by modulating the opening of each motorized valve, based upon the sensing result of said superheat sensing means.

8. A multi-room type air-conditioner according to claim 7, wherein said first temperature sensing means comprises a first sensing circuit connected between the liquid line main of the outdoor unit and the suction side of the compressor, with a pressure reducing mechanism mounted therebetween and a second temperature sensor which is provided between the suction side of said pressure reducing mechanism of said first sensing circuit and the suction side of said compressor and senses the saturation temperature of low pressure gaseous refrigerant and said first temperature sensors are mounted on each gaseous line branch of the outdoor unit.

9. A multi-room air-conditioner according to claim 1, further comprising a sub-cool sensing means comprising a third temperature sensor for sensing high pressure liquid refrigerant temperature at the use-side heat exchanger outlet in heating of each indoor unit and a second temperature sensing means for sensing the saturation temperature of said high pressure liquid refrigerant; and a means for controlling sub-cool of high pressure liquid refrigerant at the use-side heat exchanger outlet in heating of each operating indoor unit by modulating the valve openings of said motorized valves, based upon the sensing result of said sub-cool sensing means.

10. A multi-room type air-conditioner according to claim 9 wherein said second temperature sensing means comprises a second sensing circuit having a sensing heat exchanger and a pressure reducing mechanism and provided between the discharge pipe connecting the compressor with said 4-way valve and the suction pipe connecting the compressor with said 4-way valve, and a fourth temperature sensor provided between said sensing heat exchanger of said second sensing circuit and said pressure reducing mechanism for sensing saturation temperature of liquid refrigerant passing through said sensing heat exchanger and said third temperature sensor is mounted on each liquid line branch of the outdoor unit.

11. A multi-room type air-conditioner according to claim 1, further comprising a means for sensing superheat of low pressure gaseous refrigerant at the source-side heat exchanger outlet in heating; a plurality of superheat controlling valves mounted on the liquid line main and controlling opening thereof based upon the sensing result of said superheat sensing means; and a liquid receiver mounted between the liquid line branching point and said superheat controlling valve.

12. A multi-room type air-conditioner according to claim 1, further comprising a sub-cool controlling valve mounted on the liquid line main and controlling sub-cool of high pressure liquid refrigerant at the source-side heat exchanger outlet in cooling; a means for controlling the opening of said sub-cool controlling valve in cooling; and a liquid receiver mounted between the liquid line branching point and said sub-cool controlling valve.

13. A multi-room type air-conditioner according to claim 1, further comprising an operation mode sensing means for sensing whether the air-conditioner is in cooling mode or in heating mode; a second motorized valve mounted on the liquid line main and controlling refrigerant sub-cool at the source-side heat exchanger outlet in cooling and refrigerant superheat at said heat exchanger outlet in heating; and a liquid receiver mounted between said second motorized valve and the liquid line branching point.

* * * * *